Figure 1:
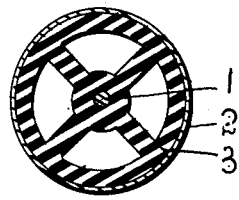
Figure 2:
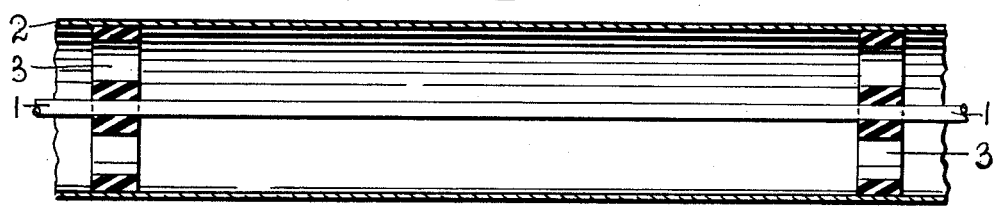
Figure 3:
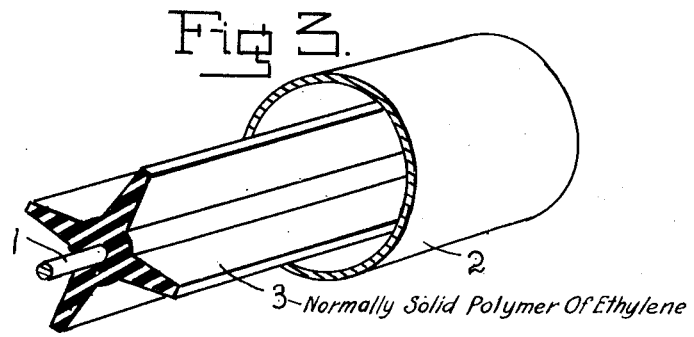
Figure 4:
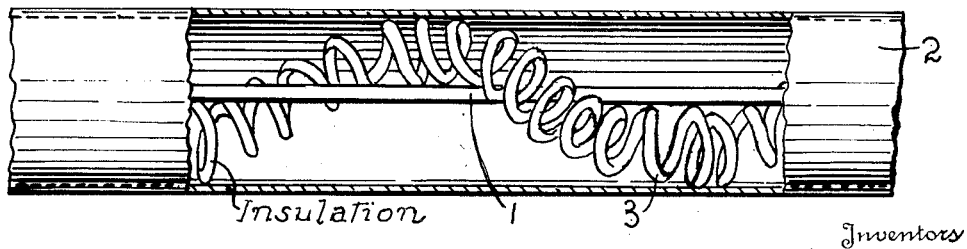

June 18, 1940.  J. C. SWALLOW ET AL  2,204,737
MANUFACTURE OF ELECTRIC CABLES
Filed Oct. 7, 1938

Inventors
John C. Swallow
Michael W. Perrin
By R. F. Miller
Attorney

Patented June 18, 1940

2,204,737

UNITED STATES PATENT OFFICE 2,204,737

MANUFACTURE OF ELECTRIC CABLES

John Cuthbert Swallow, Northwich, and Michael Willcox Perrin, London, England, assignors to Imperial Chemical Industries Limited, a corporation of Great Britain Application October 7, 1938, Serial No. 233,874
In Great Britain October 14, 1937

3 Claims. (Cl. 174—28)

This invention relates to the manufacture of cables adapted to carry electrical impulses of high frequency, i. e., at least 1000 cycles per second, and in particular to cables for use at frequencies of $10^6$ cycles and upwards, e. g., such cables as are used in short-wave television and telephony circuits, where high frequencies up to $10^7$ or $10^8$ cycles per second may be encountered. It is known to construct such cables in the form of an inner conductor located inside and air-insulated from an outer co-axial conductor, supporting pieces or spacers of suitable insulating material being disposed at intervals to maintain the inner conductor in a central position. The attenuation losses for cables of given dimensions depend mainly upon the electrical properties of the insulating spacers.

The principal object of the present invention is to provide an electric cable adapted for the carrying of electrical impulses of high frequency up to $10^7$ or $10^8$ cycles per second, in which the attenuation losses are made smaller as compared with those of known cables of the same type. A further object is to provide a cable of the above type which will be more durable and more robust. A still further object is to devise methods of manufacturing such cables. Further objects will appear hereinafter. These objects are accomplished by the following invention.

We have found that we can make a cable for transmitting high frequency impulses if the cable comprises two co-axial conductors, the inner one of which is maintained in position by means of insulating material which occupies a portion of the annular space, the insulating material essentially consisting of normally solid polymer of ethylene such as is obtained by subjecting ethylene, with or without a small content of oxygen, to very high pressure and moderately elevated temperature under controlled reaction conditions, as described in U. S. Patent Nos. 2,153,553 and 2,188,465.

The accompanying drawing illustrates three methods of building up cables according to the invention, which is not limited to the embodiments illustrated.

Figure I illustrates a cross-section of a cable at right angles to the length of the cable, showing a spacer in position.

Figure II is a cross-section along the length of the cable shown in Figure I.

Figure III is a perspective sketch of a piece of a cable having part of the cover and part of the spacer cut away to show the construction.

Figure IV represents a side elevation of another form of cable in which the outer cover has been removed to show the inner conductor and the spacers.

Referring to Figures I and II, 1 is a copper conductor approximately 1/10 inch thick, 2 is a sheath also of copper having an inside diameter of approximately ¾ inch, while 3, 3 are the spacers of polymerised ethylene fitting closely against the sheath 2 and carrying the conductor 1 in its centre.

The spacers 3 are most easily made by injection moulding a normally solid ethylene polymer of a molecular weight of from 4000–24,000. For assembly they are threaded out to the inner conductor 1 and then forced down the outer sheath 2 until they are in positions a convenient distance apart. If desired the outer conductor may be slightly compressed after the inner conductor and spacers are in position so that the supports are firmly gripped.

In Figure III, 1 is again the inner conductor, 2 the outer sheath and 3 the polymerised ethylene spacer. In this cable the spacer is continuous running the full length of the cable and is roughly of star shaped cross-section, the conductor 1 running through the centre of the star and the points pressing on the outer conductor 2.

This spacer can conveniently be made by drawing the inner conductor 1 through the nozzle of an extruder which is extruding the polymerised ethylene, the nozzle being shaped to give the star shaped cross-section.

In Figure IV, 1, 2 and 3 stand, as before, for the inner and outer conductors and the spacer respectively, the spacer in this case being made up of cold drawn threads of solid ethylene polymer woven into a cord which is wound in a helix, and then the helix is wound round the inner conductor and then both placed inside the outer conductor. (The manufacture of the cold drawn threads is described in copending application Serial No. 130,416 filed March 11, 1937.) Alternatively, tapes or ribbons of suitable thickness, made of normally solid ethylene polymers may be wound in an open helix around the inner conductor. (The manufacture of such tapes or ribbons is described and claimed in co-pending application Serial No. 138,266 filed April 21, 1937.)

Instead of the copper used for the conductors we could have used any other electrical conductor. We may use polymers having a molecular weight of at least 4000 but we prefer to use polymers of molecular weight 10,000 to 30,000 or even higher. Generally, the higher the molecular weight, the better the mechanical properties of the polymer.

Instead of making the spacers used in Figure I by injection moulding, they could have been made by compression moulding or by stamping out of a sheet of normally solid polymer of ethylene.

The molecular weights mentioned herein were obtained by the method devised by H. Staudinger (see Berichte der deutschen chemischen Ges. 1934, 67B, 1247 et seq.), this method being based upon the measurement of the viscosity of a solution of the polymer in a solvent (tetrahydronaphthalene). As this method may not be susceptible of a high degree of accuracy, the values given in this specification should in all cases be regarded as approximate.

This invention is a valuable advance in the art as these polymers of ethylene are characterized by high strength, flexibility (attained without the incorporation of plasticizers), high insulation value and extremely low dielectric power loss. Further, the polymers are practically non-absorptive to moisture and are chemically inert and very stable. The dielectric constant (about 2.2) and the power factor (about 0.001), moreover, are substantially independent of frequency over a range of about 50 to $10^8$ cycles per second, and of temperature (up to the softening point of the polymer). The combination of these physical, chemical and electrical properties makes it possible to produce robust and durable cables which have very low attenuation losses. The number of amplification stages required in a high frequency transmission line may therefore be reduced by employing our improved cable.

A further valuable advantage of the high frequency cable described herein resides in the remarkably low temperature susceptibility of the ethylene polymer insulation between the conductor and cable shell. The flexibility of the polymer at low temperatures, as for instance $-10°$ C. or lower, is substantially the same as the flexibility at normal or room temperatures.

As far as we are aware the favourable combination of physical, chemical and electrical properties, which makes normally solid polymers of ethylene so suitable for the purpose described, is not found in any other single known insulating material. The insulating material most nearly approaching the electrical properties of the solid polymers of ethylene is polystyrene, but this material lacks flexibility, and must be specially treated or used with a plasticiser in order to make it sufficiently flexible for practical purposes. The incorporation of a plasticiser, however, may impair the electrical properties of the material or may render the material less stable because of the tendency of the plasticiser to evaporate or separate out. Further the use of plasticisers reduces the softening temperature of the material.

The solid ethylene polymers employed according to this invention possess a high molecular weight ranging from about 4,000 upwards to 30,000 or even higher and a chemical constitution essentially corresponding to a homologue and true polymer of ethylene—$(CH_2)_x$—except insofar as they may contain a small amount of oxygen. These polymers by X-ray diffraction analysis show a crystalline structure. They melt or soften at around 110–120° C to a very viscous liquid and are fairly soluble in a number of organic solvents in the hot, though only sparingly so in the cold. They may be made by subjecting ethylene, with or without a small content of oxygen, to very high pressure and moderately elevated temperature under controlled reaction conditions, as described in U. S. Patents Nos. 2,153,553 and 2,188,465.

As many apparently widely different embodiments of this invention may be made without departing from the spirit and scope thereof, it is to be understood that the invention is not limited to the specific embodiments thereof, except as defined in the appended claims.

We claim:

1. An electrical cable for transmitting high frequency impulses, comprising two co-axial conductors, the inner one of which is maintained in position by means of insulating material which occupies a portion of the annular space and which is flexible, chemically inert, has at high frequencies low attentuation and low dielectric power loss, a dielectric constant substantially independent of frequency and of temperature up to the softening point of said insulating material over a range of about 50 to $10^8$ cycles per second, and which has a flexibility at low temperatures substantially the same as that for normal temperatures, said insulating material consisting essentially of normally solid polymer of ethylene which corresponds in composition substantially to $(CH_2)_x$, and which by X-ray diffraction analysis shows a crystalline structure.

2. An electric cable according to claim 1, in which the polymer has a molecular weight of at least 4,000.

3. An electric cable according to claim 1, in which the polymer has a molecular weight of between 10,000 and 30,000.

JOHN C. SWALLOW.
MICHAEL WILLCOX PERRIN.